Jan. 13, 1953
F. F. EULL
2,625,210
REMOVABLE SEAT COVER
Filed March 20, 1950
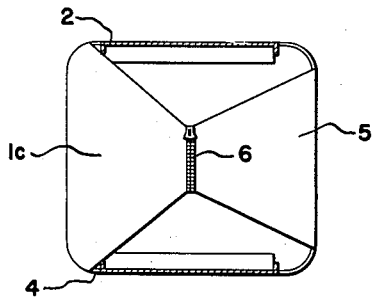
FIG. 5
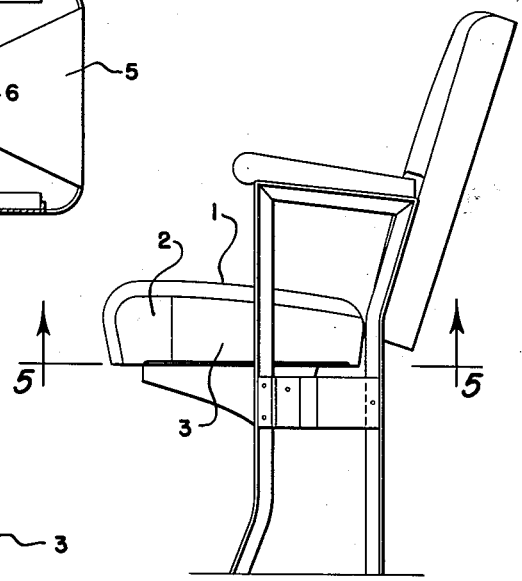
FIG. 1
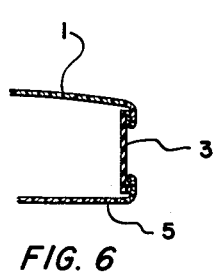
FIG. 6
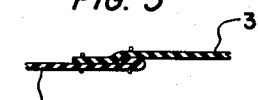
FIG. 3
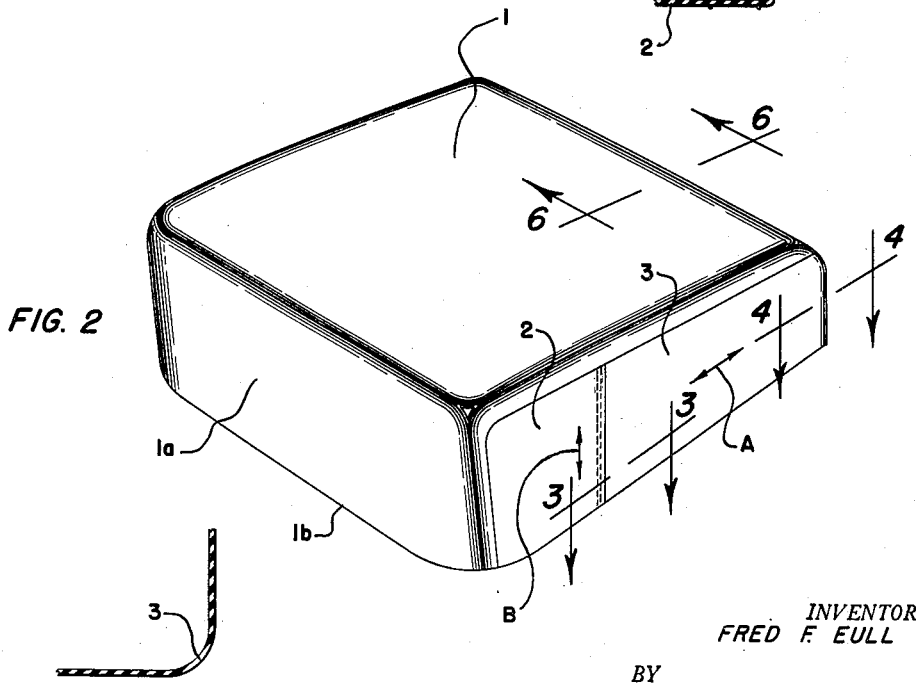
FIG. 2
FIG. 4
INVENTOR.
FRED F. EULL
BY
Wm. H. Dean
AGENT Patented Jan. 13, 1953

2,625,210

UNITED STATES PATENT OFFICE 2,625,210

REMOVABLE SEAT COVER

Fred F. Eull, San Diego, Calif., assignor to Walter W. Tufford, San Diego, Calif.

Application March 20, 1950, Serial No. 150,760

7 Claims. (Cl. 155—182)

My invention relates to a removable seat cover, and more particularly to an improvement over my co-pending application, Serial No. 54,123, for Removable Seat Cover, filed October 12, 1948, and the objects of my invention are:

First, to provide a removable seat cover which is very versatile in fitting a large variety of seats having various dimensions and configurations;

Second, to provide a seat cover of this class having a top cover portion and elastic side portions, including elastic strips which are adapted to stretch in different directions, one of said strips being adapted to stretch vertically at the corners of a cushion, while the remaining portions of the elastic strips stretch horizontally, whereby the cover is maintained in tight smooth fitting relationship with any one of a large variety of seats having varying dimensions and configurations;

Third, to provide a removable seat cover of this class which is particularly adapted for use in connection with theater seats, or the like, and which may be readily and easily installed or removed, as desired;

Fourth, to provide a seat cover of this class in which the corner portions of the cover which extend downwardly over the sides of a conventional seat, are arranged to stretch vertically are are directly connected to elastic which is arranged to stretch horizontally, which surrounds the sides and rear of the seat, providing an elastic combination having a transition near the corner of a seat covered thereby which provides for neat close-fitting coverage of seats having corners which vary considerably in shape from the upper surface of the seat to the lower surface thereof;

Fifth, to provide a removable seat cover of this class having elastic means surrounding the outer sides of the seat which is stretchable in two different directions, whereby the irregularities of a conventional seat may be readily accommodated for, whereby all of the seats of slightly varying proportions and dimensions may be evenly covered with a tight fitting top cover; and Sixth, to provide a removable seat cover of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of a conventional theater seat or the like, showing my removable seat cover in connection therewith; Fig. 2 is a perspective view of my removable seat cover, shown on enlarged scale relative to that shown in Fig. 1, and illustrating it in position normal to a seat covered thereby; Fig. 3 is an enlarged fragmentary sectional view, taken from the line 3—3 of Fig. 2; Fig. 4 is an enlarged fragmentary sectional view, taken from the line 4—4 of Fig. 2; Fig. 5 is a bottom plan view of the seat shown in Fig. 1 of the drawings, having my seat cover thereon, and Fig. 6 is an enlarged fragmentary sectional view, taken from the line 6—6 of Fig. 2.

Similar characters of reference refer to similar parts and portions throughout the several views of the drawings.

The cover 1, elastic strips 2, 3, and 4, fastening strip 5, and the fastener 6, constitute the principal parts and portions of my removable seat cover.

In the construction of my removable seat cover, I have provided a fabric, or other, cover member 1, which covers the entire top of the seat and is provided with a frontal cover portion 1a, which extends over the front of the seat and downwardly to the lower edge 1b at the front side of the seat. This cover 1, at its rear portion as shown in Fig. 6 of the drawings, is connected to the elastic strip 3, which is substantially U-shaped and which extends around the rear portion of the seat cover, and is joined at its upper edge to the cover 1, at the sides of the seats, as shown in Fig. 2 of the drawings.

This elastic strip 3, at its opposite forward edges, is sewed to the elastic strips 2 and 4, as shown best in Fig. 2 of the drawings. The elastic strips 2 and 4 are secured by sewing, or otherwise, to the cover 1 and maintain the corner shape of the cover 1, interconnecting the portions 1a at the front and the top portion of the cover 1. Sewed to the lower edge of the elastic strip 3 at the rear side of the removable cover is the fastening strip 5, which is secured to the fastener 6, which interconnects the fastening strip 5 and the bottom flap 1c of the cover 1, which is folded over at the lower edge 1b at the front side of the seat cover, for holding the cover 1 securely on a seat.

As shown in Fig. 5 of the drawings, the flap 1c and the fastening strip 5 are folded underneath the seat cushion and secured in place by the fastener 6, which is preferably a zipper or the like. It will be here noted that the elastic strips 2, 3 and 4 are resilient and tend to conform to a large variety of configurations and sizes of seats. The elastic strip 3 is stretchable in a horizontal direction, as indicated by the arrows A, while the elastic strips 2 and 4 are stretchable in a vertical direction, as indicated by the arrows B, whereby conformance in both horizontal and vertical directions is accomplished by the cover relative to the seat on which it is placed.

It will be here noted, however, that the strips 2, 3 and 4 may be of elastic material which stretches in both directions, at right angles to each other, if desired. In such construction, it is obvious that the combined elastic strips 2, 3 and 4 may occupy the same relative location, but might be made of one single piece of elastic material, stretchable in both directions.

The operation of my seat cover is substantially as follows:

In the fitting of various theater or other seats having various configurations and proportions, the elastic strips 2, 3 and 4, in connection with the cover 1, accommodate by stretching, various portions of seats which require adjustment both vertically and horizontally. Thus, the elastic material stretching in two directions provides for the fitting of different corner configurations of seats and those of different widths and proportions, so that the fastener 6, in connection with the fastening strip 5 and the tab 1c of the cover 1, may be readily secured together regardless of the particular width or different proportions and configurations of the seat.

In production of the seat cover, one particular model and size thereof may be sold to cover a variety of different seats, which greatly facilitates the production and distribution of covers for various public seating means, such as theater seats or the like.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a removable seat cover, a cover portion having an upper flexible seat top covering portion, provided with a downwardly extending portion adapted to be secured beneath the frontal portion of a seat and having a backwardly extending tab portion, provided with fastening means thereon, elastic means forming the sides of said cover and secured thereto, and extending around the rearward portion thereof, adapted to cover the vertical side and rear portions of a seat, and a fastening strip secured to said elastic means at the rear of said cover and having fastening means thereon engageable with said first-mentioned fastening means for securing said seat cover at the under side of a seat cushion.

2. In a removable seat cover, a cover portion having an upper flexible seat top covering portion, provided with a downwardly extending portion adapted to be secured beneath the frontal portion of a seat and having a backwardly extending tab portion, provided with fastening means thereon, elastic means forming the sides of said cover and secured thereto, and extending around the rearward portion thereof, adapted to cover the vertical side and rear portions of a seat, and a fastening strip secured to said elastic means at the rear of said cover and having fastening means thereon engageable with said first-mentioned fastening means for securing said seat cover at the under side of a seat cushion, said elastic means stretchable in two different directions.

3. In a removable seat cover, a cover portion having an upper flexible seat top covering portion, provided with a downwardly extending portion adapted to be secured beneath the frontal portion of a seat and having a backwardly extending tab portion, provided with fastening means thereon, elastic means forming the sides of said cover and secured thereto, and extending around the rearward portion thereof, adapted to cover the vertical side and rear portions of a seat, and a fastening strip secured to said elastic means at the rear of said cover and having fastening means thereon engageable with said first-mentioned fastening means for securing said seat cover at the under side of a seat cushion, said elastic means stretchable in two different directions, vertically and horizontally.

4. In a removable seat cover, a cover portion having an upper flexible seat top covering portion, provided with a downwardly extending portion adapted to be secured beneath the frontal portion of a seat and having a backwardly extending tab portion, provided with fastening means thereof, elastic means forming the sides of said cover and secured thereto, and extending around the rearward portion thereof, adapted to cover the vertical side and rear portions of a seat, and a fastening strip secured to said elastic means at the rear of said cover and having fastening means thereon engageable with said first-mentioned fastening means for securing said seat cover at the under side of a seat cushion, said elastic means stretchable in two different directions, vertically and horizontally, said elastic means comprising three strips. one substantially U-shaped, extending around the sides and rearward portion of said cover, and the other two extending from said cover member near the frontal corners of the cover and adapted to extend downwardly over the vertical frontal corners of a seat cushion.

5. In a seat cover of the class described, a cover member of flexible character adapted to extend over the top of a seat and down the frontal portion thereof and rearwardly on the under side thereof, elastic means of U-shaped form secured to said cover and adapted to extend around the vertical sides and rear of a seat cushion and a fastening strip secured to the lowermost edge of said U-shaped elastic means near the rear middle portion of said U-shaped elastic strip, and adapted to extend forwardly on the lower side of a seat cushion, and fastening means for securing said fastening strip and the lowermost rearwardly extending portion of said cover.

6. In a seat cover of the class described, a cover member of flexible character adapted to extend over the top of a seat and down the frontal portion thereof and rearwardly on the under side thereof, elastic means of U-shaped form secured to said cover and adapted to extend around the vertical sides and rear of a seat cushion, and a fastening strip secured to the lowermost edge of said U-shaped elastic means near the rear middle portion of said U-shaped elastic strip, and adapted to extend forwardly on the lower side of a seat cushion, and fastening means for securing said fastening strip and the lowermost rearwardly extending portion of said cover, said elastic means stretchable in both vertical and horizontal directions.

7. In a seat cover of the class described, a cover member of flexible character adapted to extend over the top of a seat and down the frontal portion thereof and rearwardly on the under side thereof, elastic means of U-shaped form secured to said cover and adapted to extend around the vertical sides and rear of a seat cushion, and a fastening strip secured to the lowermost edge of said U-shaped elastic means near the rear middle portion of said U-shaped elastic strip, and adapted to extend forwardly on the lower side of a seat cushion, and fastening means for securing said fastening strip and the lowermost rearwardly extending portion of said cover, said elastic stretchable in two directions.

FRED F. EULL.

REFERENCES CITED

The following references are of record in the file of this patent:

UNITED STATES PATENTS

| Number | Name | Date |
|---|---|---|
| 1,771,872 | Brock et al. | July 29, 1930 |
| 1,836,302 | Bloomfield | Dec. 15, 1931 |
| 1,889,662 | Hyman | Nov. 29, 1932 |